May 27, 1952     D. J. PEEPS     2,598,009
VALVED PIPE COUPLING
Filed March 25, 1950
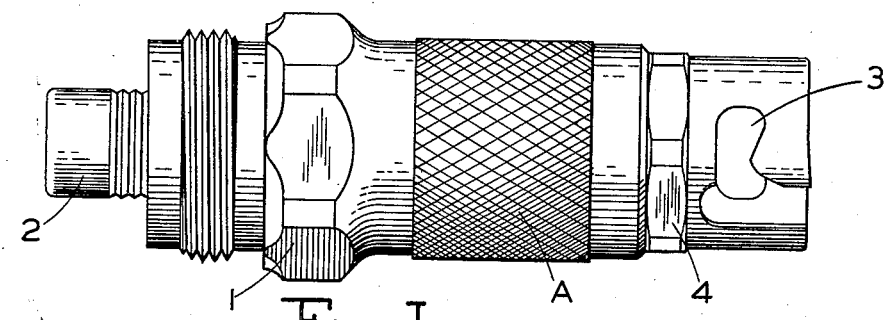
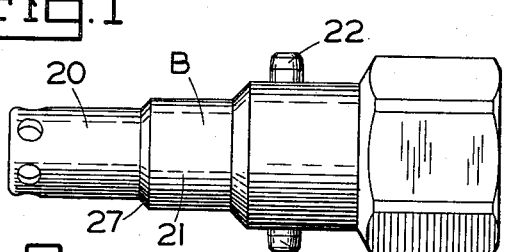
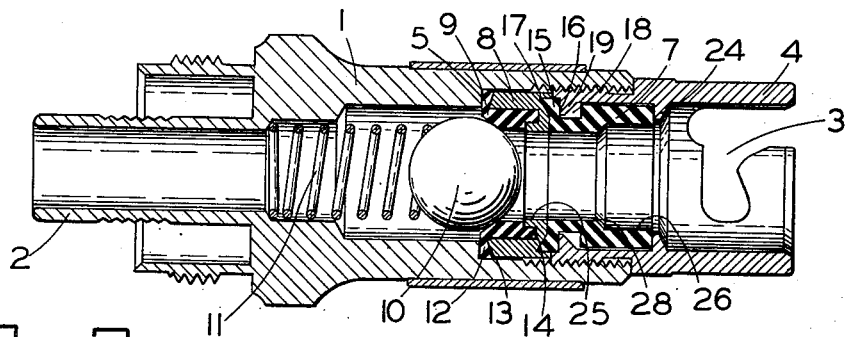
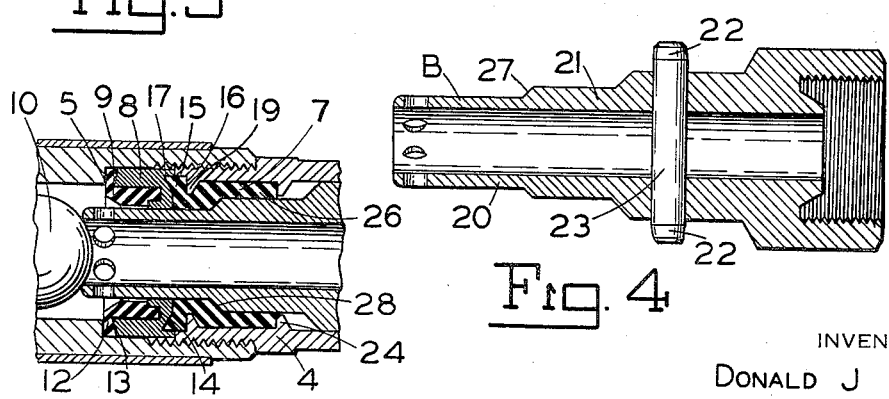
INVENTOR
DONALD J PEEPS
BY W. P. Carr
ATTORNEY Patented May 27, 1952

2,598,009

UNITED STATES PATENT OFFICE 2,598,009

VALVED PIPE COUPLING

Donald J. Peeps, Toledo, Ohio, assignor to The De Vilbiss Company, Toledo, Ohio, a corporation of Ohio Application March 25, 1950, Serial No. 151,847

5 Claims. (Cl. 284—19)

This invention relates to a coupling of the quickly detachable type, in one part of which a check valve is located. The valve is opened when the two parts of the coupling are connected together. Couplings of this general type have been used for many years in air lines and in some instances for liquids. However, in attempting to apply them to lines carrying liquid coating materials considerable difficulty has been encountered due to the abrasive and clogging tendencies of the pigments ordinarily carried by such materials.

The principal object of this invention is the provision of a coupling with sealing means particularly adapted to provide a tight closure and to withstand long continued usage with pigmented materials.

This object is partly secured through the provision of a sealing material of solvent resisting character and one that is securely held in place. The object is further derived from the provision of a space into which a portion of the sealing member is driven when the two parts of the coupling are attached together.

Other objects and advantages will be apparent upon reading the following specification with reference to the accompanying drawing, in which—

Fig. 1 is a side elevation of the main part or female member of the coupling forming the subject of this invention;

Fig. 2 is a similar view of the male member of the coupling;

Fig. 3 is a longitudinal vertical section of the part shown in Fig. 1;

Fig. 4 is a similar section of the male member; and

Fig. 5 is an enlarged fragmentary vertical section showing the two parts of the coupling in assembled relation.

Referring to the drawings in more detail, the female member A shown in Figs. 1 and 3 and partially in Fig. 5 includes a body 1 with an integral nipple 2 at the forward end for reception of a hose. To the opposite or rearward end of the body 1 is threaded ferrule 4. This has bayonet opening 3 for engagement with the male member of the coupling. Held between the forward end of the ferrule 4 and the rearwardly facing shoulder 5 in the body are the lateral flange 15 of the compressible sealing sleeve 7, locking ring 8 and valve seat 9. Seating against valve seat 9 is the ball valve 10 which is held thereagainst by spring 11. The seat 9 has an outwardly flaring flange 12 clamped between the shoulder 5 of the body 1 and the outwardly bevelled, forward edge 13 of the locking ring 8. To further hold the seat in place, the locking ring has a forwardly facing groove 14 in which the rearward edge of the seat is lodged.

The sealing sleeve 7 has, on its forward end, an outwardly projecting annular lip 15 which is held between indentations 16 and 17 in the adjoining surfaces of the ferrule 4 and the locking ring 8. The projecting lip 15, being wider at its outer periphery, is held securely in place. When the coupling members are disengaged, there is an annular air space 18 between the sleeve 7 and the member 4 adjacent the rearward side of the inwardly extending flange 19.

The male member B of the coupling, as illustrated in Figures 2 and 4 and fragmentarily in Figure 5, is threaded at its rearward end for attachment to a spray gun or other liquid handling device. At its forward end is a laterally ported tubular section 20, rearwardly adjoining which is an enlarged cylindrical portion 21. The bayonet points 22 for fastening the male member B to the female member A are formed by the radially protruding ends of a rod 23 press fitted into a cross bore through the member.

When the male member B is introduced into the female member A the tubular section 20 is centrally guided, initially by the inward projection 24 of the ferrule 4, and more accurately by the cylindrical bearing surface 25 on the ring 8. The forward end of the section 20 contacts and displaces from its seat 9 the ball valve 10. Prior to the opening of the valve 10 the cylindrical portion 21 of the male member has entered the rearward extension 26 of the sealing sleeve 7 with which it has a sufficiently close fit to prevent any escape of the liquid first passing the valve 10.

The final effective seal between the two members A and B is secured between the forwardly facing shoulder 27 at the juncture of the tubular section 20 and the cylindrical portion 21 of the male member and the rearwardly facing shoulder 28 of the sealing sleeve 7. The bayonet connection forces these shoulders firmly together and material of sleeve 7 is displaced forwardly into the space 18. Any air that is thus compressed behind the sealing sleeve 7 cooperates with the resilient nature of the sleeve 7 to press the shoulder 28 against the shoulder 27 of the male member.

In the assembly of the female member A the spring 11 is first inserted and the ball valve 10 placed against it. While the valve is held depressed, the valve seat 9 and the locking ring 8, previously assembled together, are set in against the relatively facing shoulder 6. The ferrule 4 with the sealing sleeve 7 positioned within it is then threaded into the body 1. The contact between the ferrule 4 and the ring 8 over the edge of the lip 15 prevents the lip from being compressed to a degree that would wedge the body of the sleeve 7 inwardly sufficient to have binding contact with the section 20 of the male member B. The rearward edge of the valve seat 9 is protected against dislodging during the forward movement of the tubular seat in 20 by being positioned in the groove 14 in the locking ring 8. Similar dislodgement of the rear edge of sleeve 7 is avoided through the protection of the projection 24.

In order that a coupling of this type may be efficient over a long period the valve seat and sealing means must be able to withstand swelling, shrinkage or other deterioration continued contact with coating solvents. A synthetic rubber is accordingly preferred as the composition of sleeve 7 and valve seat 9.

It is further highly important that the seat and sealing means be securely positioned so that the action of the valve, the pressure and flow of the liquid, and the connection and disconnection of the coupling parts will not disturb or unduly distort them.

This is accomplished in the subject invention primarily by providing the sleeve 7 and the valve seat 9 respectively with outwardly extending flared lip 15 and the flared flange 12 both of which are firmly wedged in place, and secondly by protecting the free ends of the sleeve 7 and seat 9 by respectively the projection 24 and groove 14.

An aditional feature contributing significantly to the efficiency of the subject coupling is the air space beneath sleeve 7 which adds give and resiliency to the sealing surface of this sleeve.

It is apparent therefore that this invention includes a number of advantageous features which individually and jointly are responsible for a markedly improved coupling.

Various changes may be made in the specific embodiment disclosed without departing from the spirit of the invention or the scope of the appended claims.

I claim:

1. In a coupling of the type described a female member, a sealing sleeve within the member, a rearwardly facing inner shoulder on the sleeve, an outwardly facing annular groove on the periphery of the sleeve slightly forward of the shoulder, said groove having parallel forward and rearward side walls and an inwardly directed flange on the member having a forwardly facing flat side abutting the forward side wall of the groove, the rearward side of the flange being spaced from the rearward side wall of the groove thus providing an annular space therein.

2. In a coupling of the type described a female member, a male part engaged in said female member, a sleeve in the female member providing a sealing contact between the member and the male part, a ferrule threaded into the female member, a ring held within the member by the ferrule, forwardly thereof, the adjacent edges of the ring and ferrule having opposing indentations therein forming together an outwardly flaring groove, and an annular outwardly flaring flange on the sleeve positioned within said groove.

3. A coupling as set forth in claim 2 in which there is a valve and a valve seat within the member and the valve seat is held in place by the ring.

4. In a coupling of the type described, a female member, a valve and a resilient annular seat therefor in the member, a compressed spring supported within the member and bearing against the valve, a male part engaged in said member and holding the valve away from the seat in opposition to the spring, a valve seat retaining ring generally cylindrical in form, an outwardly flaring flange on the forward end of the seat, a rearwardly facing shoulder in the member between which and the forward edge of the ring the flange is held, the valve seat having a cylindrical portion extending rearwardly in adjoining relation to the inner cylindrical portion of the retaining ring, an inwardly extending flange on the rear end of the retaining ring with its edge turned forwardly, over, and in retaining relation to the rearward end of the cylindrical portion of the seat, and a ferrule threaded into and forming a part of the member, the forward end of the ferrule abutting the rearward end of the ring to hold the ring and seat in place.

5. A coupling as set forth in claim 4 in which there is a cylindrical sealing sleeve between the female member and the male part, said sleeve being held in place endwise between the rearward end of the retaining ring and in inwardly extending flange within the ferrule part of the member.

DONALD J. PEEPS.

REFERENCES CITED

The following references are of record in the file of this patent:

UNITED STATES PATENTS

| Number | Name | Date |
|---|---|---|
| 1,890,011 | Wirz et al. | Dec. 6, 1932 |
| 1,905,777 | Williams | Apr. 25, 1933 |
| 2,024,682 | Eisenman | Dec. 17, 1935 |
| 2,248,701 | Fowler | July 8, 1941 |
| 2,255,333 | Scheiwer | Sept. 9, 1941 |
| 2,307,393 | Crowley | Jan. 5, 1943 |
| 2,397,265 | Jacobsson et al. | Mar. 26, 1946 |